Oct. 30, 1962 J. P. ZAWACKI 3,061,268
WEDGE SEAL FOR VALVE BODY
Filed Aug. 17, 1960
FIG_1
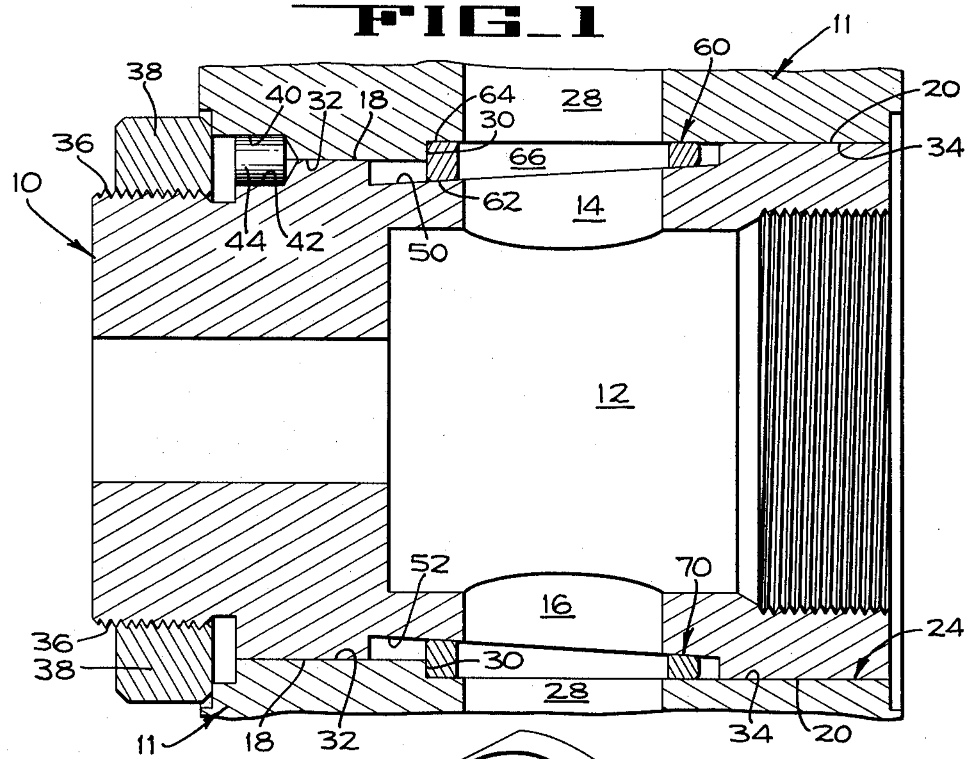
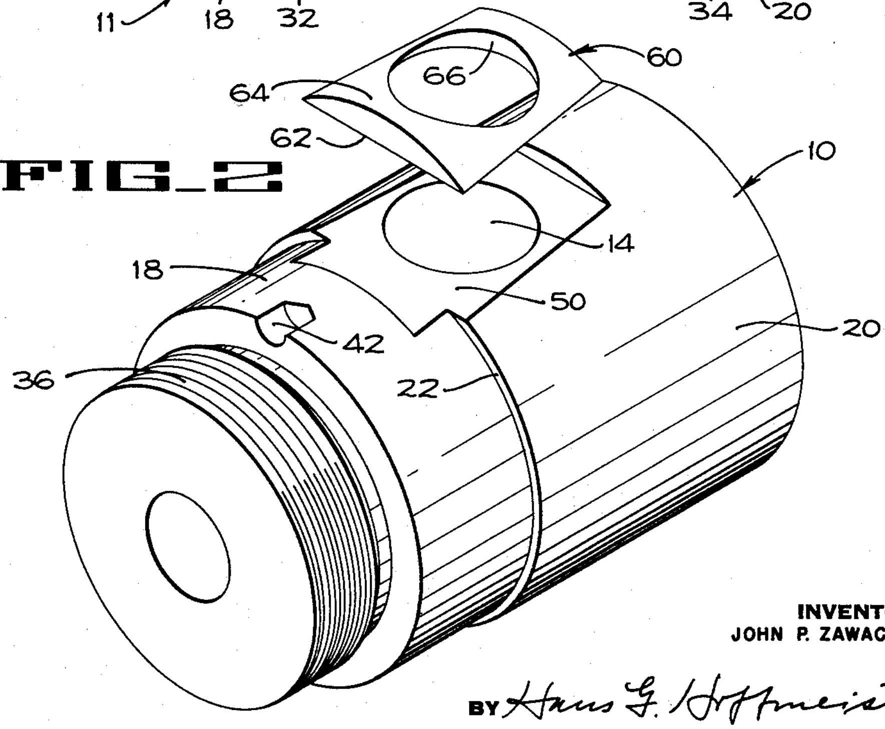
FIG_2
INVENTOR
JOHN P. ZAWACKI
BY Hans G. Hoffmeister
ATTORNEY United States Patent Office 3,061,268

Patented Oct. 30, 1962

3,061,268

WEDGE SEAL FOR VALVE BODY

John Paul Zawacki, Houston, Tex., assignor to Oil Center Tool Company, Houston, Tex., a corporation Filed Aug. 17, 1960, Ser. No. 50,281
5 Claims. (Cl. 251—314)

The present invention pertains to fluid seals and more particularly relates to a seal member for sealing around matching ports in a valve body and a member into which the valve body is inserted.

The present invention provides a fluid seal particularly adapted for use in the type of apparatus disclosed in the co-pending application of J. M. Lebeaux et al., Serial No. 755,470, filed August 18, 1958, entitled Integral Wellhead Assembly, and assigned to the same assignee as the instant application. It is to be understood, however, that the seal of the present invention in advantageously applicable to other piping installations which are subjected to extremely high fluid pressures.

An object of the present invention is to provide a novel high-pressure seal assembly.

Another object of the invention is to provide a wedge type seal member for use with a valve body having a cam surface adapted to energize the seal when the valve body is installed.

Other objects and advantages of the invention will become apparent from the following specification and the accompanying drawings, in which:

FIG. 1 is a fragmentary section through a valve body, the element within which it is installed, and two wedge type seals of the invention in cooperative association therewith.

FIG. 2 is a perspective showing a valve body and a seal of the invention in exploded relation to the valve body.

The apparatus for which the seal of the present invention was particularly designed, and which is disclosed in the aforementioned application of Lebeaux et al., comprises a valve body such as that indicated at 10 in the accompanying drawings, installed within a massive well head structure 11 (FIG. 2). Because the invention pertains only to the external sealing of the valve body 10, the core of the valve is not illustrated. However, it will be understood that the core of the valve consists of an elongate rotatable cylindrical plug member provided with a passage therethrough at right angles to its longitudinal axis. The plug is rotatably mounted within a plug chamber 12 within the valve body 10, and when the plug is disposed with its passage in alignment with opposed ports 14 and 16 in the valve body 10, a fluid flow passage is open from one port 14 to the other port 16. Conversely when the valve plug is rotated so that its passage is no longer in alignment with the ports 14 and 16 no fluid flow can occur through the valve body 10.

It will be noted that the outer surface of the valve body 10 is cylindrical and that it is stepped to provide a smaller diameter portion 18 and a larger diameter portion 20 separated by a shoulder 22.

The valve body 10 is adapted to be inserted into a cylindrical socket 24 in the well head structure 11, which has a longitudinal flow passage 28 therein intersecting the socket 24. It will be noted that the socket 24 extends through the well head structure 11 and is open at both ends. It is stepped to form a shoulder 30 between a smaller diameter portion 32 and a larger diameter portion 34. When the valve body 10 is inserted until the shoulder 22 thereon abuts the shoulder 30 within the socket 24, the ports 14 and 16 of the valve body will be in alignment with the flow passage 28 of the well head structure 11. The smaller diameter end of the valve body 10 is provided with external threads 36 adapted to receive a retaining nut 38 which, when tightened, abuts the outer face of the well head structure 11 to retain the valve body 10 therein. It will also be noted that the well head structure 11 and the valve body 10 are provided with registering key receiving grooves 40 and 42, respectively, within which a key 44 is located in order to maintain alignment of the ports 14 and 16 with the flow passage 28.

A smooth flat cam surface 50 is machined on the outer surface of the valve body 10 surrounding the port 14 therein. The surface 50 is inclined with respect to the longitudinal axis of the body 10 so that the end of the cam surface 50 which is nearest the smaller diameter portion 18 of the valve body 10 is closest to the longitudinal axis thereof, as clearly shown in FIG. 1. A similar flat machined cam surface 52 is formed on the opposite side of the body 10 and surrounds the port 16 therein.

The sealing member 60 of the invention is made of a suitable slightly yieldable material such as malleable metal or a suitable compounded plastic. It is formed with a flat inner surface 62 and an arcuate outer surface 64. In longitudinal section, the inner and outer surfaces of the seal member 60 are closer together at one end of the seal than at the other end as shown in FIG. 1. Thus the seal member is wedge shaped, having its inner surface inclined with respect to the outer surface 64 by the same angle as is the surface 50 inclined with respect to the axis of the body 10. The seal 60 is provided with a central port 66 extending therethrough which is of slightly larger diameter than, and is adapted to register with, the port 14 in the valve body 10.

When the valve body 10 is installed within the well head structure 11, the seal 60 is placed on the flat machine surface 50 with its larger end adjacent the deeper end of said surface 50. A similar seal 70 is similarly installed on the flat machined surface 52 on the opposite side of the valve body 10. The valve body 10 is then inserted into the larger end of the socket 24 in the well head structure 11 and is slid into the socket until the threaded end 36 of the body 11 projects through the opposite end of the socket. As the valve body 10 is slipped into place the larger ends of the seals 60 and 70 engage the shoulder 30 thus immobilizing the seals 60 and 70 while the valve body continues to move more deeply into the socket 24. The nut 38 is screwed onto the thread 36 and is tightened to draw the valve body 10 tightly into the socket 24. As the body 11 then continues to move past the stationary, wedge shaped seals 60 and 70, the cam surfaces 50 and 52 tightly wedge the seal members 60 and 70 between the cam surfaces 50 and 52 and the wall of the larger diameter portion 34 of the socket 24 through the well head structure 11.

In this manner, each seal member 60 and 70 is caused to bear with very great pressure against the wall of the socket 24 in an area encircling the passage 28, and against the outer surface of the valve body 10 in an area encircling the port 14 or 16, as the case might be. Advantage is taken of the great mechanical advantage provided by the wedge-shaped configuration of the seals to attain this great pressure of the seals against the two seating surfaces between which each seal is compressed, thereby attaining such intimate contact thereagainst that an efficient fluid seal is established between the seals and the body 10 and between the seals and the well head structure 11 dependably preventing fluid leakage or seepage between the valve body and the well head even when fluid under extremely high pressure is present within the passage 28. Being made of slightly yieldable material, the great physical pressure of the seals against their seat surfaces causes the seals to conform to any slight irregularities that may exist in the seat surfaces, thereby further enhancing the efficiency and dependability of the seals to prevent leakage or seepage in these critical regions.

It will be recognized that the seal disclosed herein attains a much greater area of sealing contact with the adjacent parts than was possible with a series of concentric seals such as were formerly used in installations of this type. This is another factor contributing to the capability of the sealing member disclosed herein of dependably sealing against extremely high working pressures.

A further advantage of the use of the seal member of the present invention is that it avoids the necessity of using a tapered valve body to provide a metal to metal seal contact between the valve body and the socket within which it is installed thus making the valve body much easier to machine, to install, and to remove from the well head structure.

While a preferred embodiment of the invention has been disclosed herein, it should be noted that various changes may be made therein without departing from the spirit of the invention as defined in the appended claims.

The invention having thus been described what is claimed as new and desired to be protected by Letters Patent is:

1. In combination, a member having a flow passage and a socket therein intersecting said flow passage, a body adapted to be received in said socket and having ports adapted to register with said flow passage, a cam surface on said body surrounding one of said ports and inclined with respect to the axis of said body, and a wedge shaped seal member adapted to rest on said cam surface and be wedged thereby into sealing engagement with the wall of said socket, and means for causing relative movement between said seal and said body as said body is inserted into said socket.

2. In combination, a member having a flow passage and a socket of circular cross section therethrough intersecting said flow passage, a body of circular cross section adapted to be received in said socket and having ports adapted to register with said flow passage, the walls of said socket and said body being parallel to the axis of said body, a flat cam surface on said body surrounding one of said ports and inclined with respect to the axis of said body, a seal member adapted to rest on said cam surface and be wedged thereby into sealing engagement with the wall of said socket, said seal member having inner and outer surfaces inclined to each other by the same angle as said cam surface is inclined to the axis of said body, and means for causing relative movement between said seal and said body as said body is inserted into said socket.

3. In combination, a member having a flow passage and a cylindrical socket therethrough intersecting said flow passage, a cylindrical body adapted to be received in said socket and having ports adapted to register with said flow passage, a flat cam surface on said cylindrical body surrounding one of said ports and inclined with respect to the axis of the body, a wedge shaped seal member adapted to rest on said cam surface and be wedged thereby into sealing engagement with the wall of said socket, and means for causing relative longitudinal movement between said seal and said cylindrical body as cylindrical body is inserted into said socket to cause said seal member to be tightly wedged between said cam surface and the wall of said socket.

4. In combination, a member having a flow passage and a cylindrical socket therethrough intersecting said flow passage, a cylindrical body adapted to be received in said socket and having ports adapted to register with said flow passage, a flat cam surface on said cylindrical body surrounding one of said ports and inclined with respect to the axis of said body, a seal member adapted to rest on said cam surface and be wedged thereby into sealing engagement with the wall of said socket, said seal member having inner and outer surfaces inclined to each other by the same angle as said cam surface is inclined to the axis of said cylindrical body, and means for causing relative longitudinal movement between said seal and said cylindrical body as said cylindrical body is inserted into said socket to cause said seal member to be tightly wedged between said cam surface and the wall of said bore.

5. In combination, a member having a flow passage and a cylindrical socket therethrough intersecting said flow passage, a cylindrical body adapted to be received in said socket and having ports adapted to register with said flow passage, a flat cam surface on said cylindrical body surrounding one of said ports and inclined with respect to the axis of said body, a seal member having a flat inner surface adapted to rest on said cam surface and an arcuate outer surface, said inner and outer surface being inclined to each other by the same angle as said cam surface is inclined to the axis of said body, and means for causing relative longitudinal movement between said seal and said cylindrical body as said cylindrical body is inserted into said socket to cause said seal member to be tightly wedged between said cam surface and the wall of said socket.

References Cited in the file of this patent

UNITED STATES PATENTS

| | | |
|---|---|---|
| 559,926 | Baker | May 12, 1896 |
| 733,905 | Erdman | July 14, 1903 |
| 860,217 | Jackson | July 16, 1907 |
| 2,192,331 | Schaefer | Mar. 5, 1940 |
| 2,479,124 | Laurent | Aug. 16, 1949 |

UNITED STATES PATENT OFFICE
CERTIFICATE OF CORRECTION

Patent No. 3,061,268 October 30, 1962

John Paul Zawacki

It is hereby certified that error appears in the above numbered patent requiring correction and that the said Letters Patent should read as corrected below.

In the grant, lines 1 and 2, for "assignor to Oil Center Tool Company, of Houston, Texas, a corporation," read -- assignor, by mesne assignments, to FMC Corporation, of San Jose, California, a corporation of Delaware, --; line 11, for "Oil Center Tool Company, its successors" read -- FMC Corporation, its successors --; in the heading to the printed specification, lines 3 and 4, for "assignor to Oil Center Tool Company, Houston, Tex., a corporation" read -- assignor, by mesne assignments, to FMC Corporation, San Jose, Calif., a corporation of Delaware --.

Signed and sealed this 30th day of April 1963.

(SEAL)
Attest:
ERNEST W. SWIDER
Attesting Officer

DAVID L. LADD
Commissioner of Patents